Jan. 19, 1971     H. E. PAHLKE     3,555,604
BIAXIAL ORIENTATION

Original Filed March 12, 1965     2 Sheets-Sheet 1

INVENTOR.
HEINZ E. PAHLKE
BY
ATTORNEY

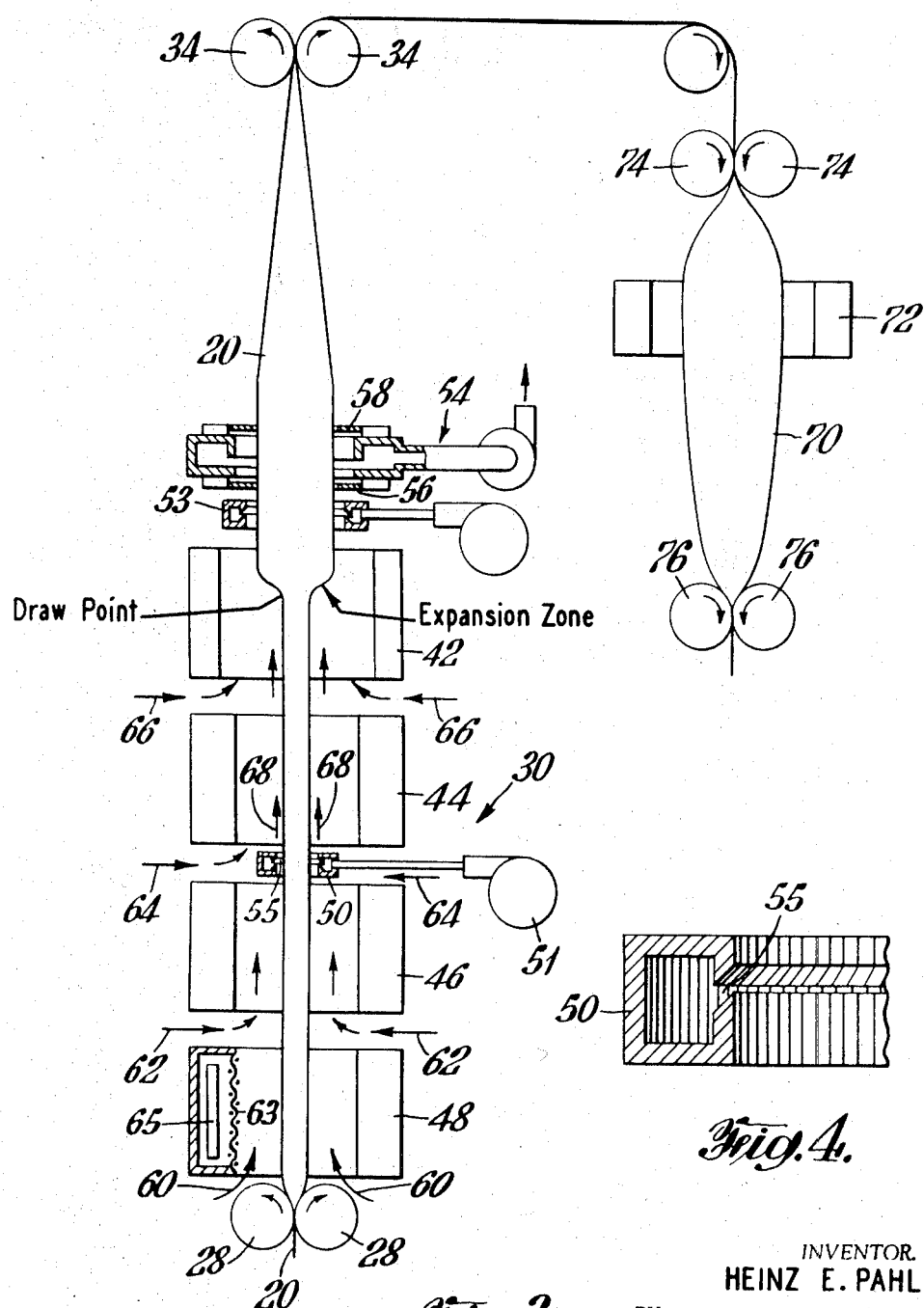

United States Patent Office 3,555,604
Patented Jan. 19, 1971

3,555,604
BIAXIAL ORIENTATION
Heinz Erich Pahlke, Worth, Ill., assignor to Union Carbide Corporation, a corporation of New York
Original application Mar. 12, 1965, Ser. No. 439,312, now Patent No. 3,456,044, dated July 15, 1969. Divided and this application Dec. 5, 1968, Ser. No. 798,839
Int. Cl. B29d 23/04
U.S. Cl. 18—14                    5 Claims

ABSTRACT OF THE DISCLOSURE

Apparatus for biaxially orienting thermoplastic tubing comprises a radiant heater system, means for passing tubing upwardly through said heater system and for isolating a bubble of fluid within the tubing in its upward travel. The radiant heater system comprises a plurality of stacked heaters spaced apart providing for access of coolant fluid to the tubing in its upward passage and between heaters a conduit for directing high velocity coolant fluid upwardly against the tubing is provided.

---

This application is a division of application Ser. No. 439,312, filed Mar. 12, 1965 now Pat No. 3,456,044.

This invention relates to biaxially oriented thermoplastic film produced by the tubular orientation techniques, and for conciseness will be directed with particular reference to apparatus for the tubular biaxial orientation of low density polyethylene films.

The process of biaxially orienting films from a variety of thermoplastic materials is well known as are the advantages of the biaxially oriented films so produced. Biaxially oriented films of polypropylene, high-density polyethylene, polystyrene, and polyvinylidene chloride have achieved substantial commercial recognition.

Low density polyethylene has well known advantages, for example, toughness at low temperature, strength and relatively low cost. The desirability of the use of such film in packaging, particularly in low temperature applications and shrinkage applications where high percentages of shrinkage with accompanying high shrink force are required, along with its other known advantages recommend low density polyethylene for the production of biaxially oriented film.

However, tubular biaxially oriented low density polyethylene has heretofore not been produced commercially from polyethylene resins having densities below about 0.94 gram per cubic centimeter (gm./cc.), a melt index above 0.3 decigram per minute (dg./min.) and an intrinsic viscosity below 1.2 deciliters per gram (dl./gm.). Tubings made from polyethylene resins having melt indices below 0.3 dg./min. and intrinsic viscosities above 1.2 dl./gm. have been biaxially oriented by the prior art method of passing the tubing, containing an isolated "bubble," through a single-stack radiant heater and radially expanding the tubing at the draw point. However, the expansion ratios were uncontrollable and only thin film of thicknesses less than 1 mil such as 0.5 mil were produced. For packaging of certain foodstuffs, such as turkeys, it is required that the oriented film have a thickness of about 1.5 mils or greater for greater strength, mechanical durability and puncture resistance. Also high shrinkage with accompanying high shrink force at 90° C. is required to yield a package that will adequately protect the contents during storage, particularly at low temperatures. It should be noted that low density polyethylene, if irradiated, can be and has been biaxially oriented, but this is not a completely satisfactory solution for the irradiated material is relatively expensive, and the final film is more difficult to heat seal. A means to differentiate the irradiated polyethylene from that which has not been irradiated, is the xylene solubility test. The term "solubility is xylene" refers to solubility in xylene boiling at 137° to 140° C. This test is used herein to determine the maximum extent of cross-linking in the film as extruded, and, therefore, the fusibility and heat sealability. Since irradiation of the thermoplastic material increases the extent of cross-linking, the solubility in xylene test serves as an indication of the absence of significant irradiation.

It is an object of this invention to provide apparatus for a biaxially orienting of low density polyethylene resins having high melt indices, and low intrinsic viscosities, particularly in heavy gauge films.

A further object of the invention is the provision of apparatus for a tubular orientation process for the production of biaxially oriented films of increased thickness with relatively uniform gauge control.

A further object of the invention is the provision of apparatus for a tubular orientation process which provides film having improved properties such as clarity, gloss, shrinkage, shrink force, tensile strength and the like.

Other and additional objects will become apparent from the description and accompanying drawings.

The objects of the invention are achieved by improvements in apparatus for what is sometimes referred to as the "double-bubble" method for biaxially orienting thermoplastic films, in which a primary tubing is first formed by melt extrusion from a die, inflated by the admission of air, cooled, collapsed, and then reinflated to form an isolated bubble and the tubing is advanced through a heating zone to raise the film to its draw temperature. In a draw or expansion zone the tubing is radially expanded in both the transverse and machine directions at a temperature such that orientation occurs in both directions—the expansion of the tubing being accompanied by a sharp, sudden reduction of thickness at the draw point. The apparatus of the invention makes possible careful, concise control of temperature of the film as it is advanced through the heating zone. The term heating zone is used to define the region which includes both the zone of preliminary heating of the primary tubing to the draw temperature and also the draw or expansion zone.

In the apparatus of the present invention the tubing is biaxially oriented by passing the tubing through a radiant heating zone and rapidly radially extending said tubing when said tubing is at the draw temperature. The tubing is contacted with a stream of cooling fluid, while said tubing is in the heating zone, the temperature of the cooling fluid being decreased at least at one point within the heating zone, to a temperature substantially below the temperature to which the cooling fluid has been heated during its flow through the heating zone up to said at least at one point within said heating zone. The temperature of the cooling fluid in the draw zone is at least 10° F. below that of the tubing at the draw point.

Preferably the cooling fluid is air, and a stream of high velocity air is blown in a generally upward direction, toward the radially extended portion of the tubing, said high velocity air drawing into the heating zone, by aspiration, a plurality of additional stream of air into the heating zone at spaced positions upward of the position at which said cooling fluid enters the heating zone. Each of the additional streams of air is in a quantity and at a temperature such as to cause the temperature of said cooling fluid to be substantially decreased at said spaced positions.

The invention will be more fully understood from the following description and accompanying drawing wherein:

FIG. 3 is a diagrammatic illustration of a modification of apparatus suitable for orienting tubing according to the invention; and FIG. 4 is an enlarged detailed, fragmentary view, partly in section, of an air ring.

Figure 1:
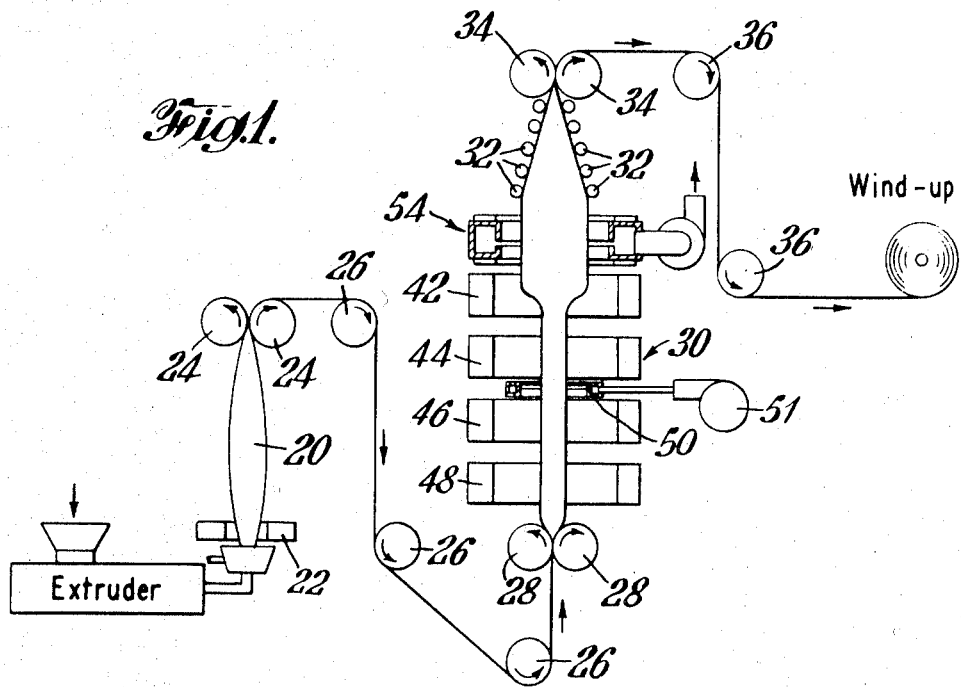
FIG. 1 is a diagrammatic illustration of apparatus suitable for the practice of the invention; showing, in addition to other elements, an extruder.
Figure 2:
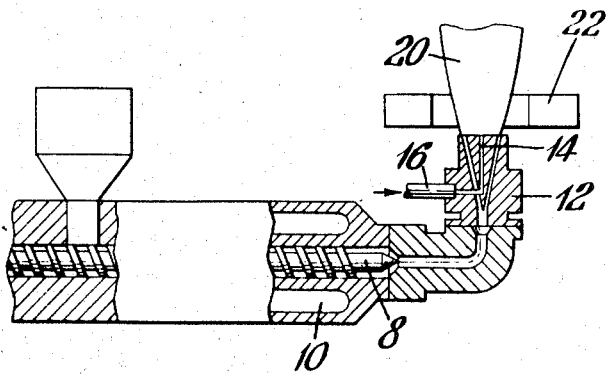
FIG. 2 is an enlarged detailed view, partly in section; of the extruder of FIG. 1.

The primary tube can be made by any of the known techniques for extrusion of tubular plastic film. For example, as seen in FIGS. 1 and 2, the polymer is fed into an extruder wherein it is heated to an appropriate temperature, e.g., 50°–70° C. above the melting point of the polymer to cause the melting thereof. The extruder may be provided with a jacketed chamber 10 through which a heating medium is circulating. The rotation of the screw 8 forces molten polymer through a die 12 which is provided with a central orifice 14 which in turn is connected to an air supply 16. The resultant tubing 20 is inflated or expanded by introducing air into the interior thereof in sufficient quantity to give the desired diameter. The inflated tubing 20 is drawn upwardly and interiorly through a cooling ring 22 by a pair of rotating squeeze rolls 24 which also serve to collapse the tubing and retain the air in that portion of tubing between the squeeze rolls and the die. Cooling air is supplied to the cooling ring 22 and passes therefrom through perforations onto the exterior surface of the tubing 20. The stream of cooling air constitutes a cooling zone serving to chill or set the expanding plastic tube to the desired temperature. The film can be reeled and then separately oriented or can be oriented in line as shown in FIG. 1.

To orient in line the flattened primary tubing then passes over suitable guide rolls 26 to driven squeeze rolls 28, then is reinflated to form a secondary bubble which is drawn vertically upward through cylindrical radiant heaters, whereby the film is reheated to a temperature at which the film becomes drawable and orients when stretched but below the temperature at which the film merely thins out when stretched without appreciable orientation.

The tubing is cooled during its upward travel through the heater system, by air which is drawn into the heater zone due to a chimney effect and because of an aspiration effect caused by air blown through the air ring 50 as more fully described hereinafter.

The tubing then contacts a series of converging rolls 32 and is flattened by driven squeeze rolls 34. The peripheral speed of squeeze rolls 34 is greater than that of squeeze rolls 28 in order to either pick up slack formed during biaxial stretching or to impart additional machine direction stretch. Thus, the desired orientation of the film is produced during its passage through the apparatus between the squeeze rolls 28 and 34 (machine direction) as well as transversely thereto (transverse direction). After passing through squeeze rolls 34 the tubing is passed over suitable guide rolls 36 and wound up on a wind-up reel the tension of which is controlled. If sheeting is desired, the tubing may be slit after passing through the squeeze rolls 34.

The temperature control of the invention may be provided, for example, as shown in detail in FIG. 3 by a cylindrical radiant heater system 30 comprising a plurality of radiant heaters 42, 44, 46 and 48 spaced apart from each other. Each of such heaters include a series of electrical resistance elements 65 equally spaced about the circumference of the heater and controlled by a known transformer type control (not shown). The internal diameter of each radiant heater is preferably faced with screening 63 behind which are placed the heating elements 65. The diameter is sufficiently large to allow the tubing in its radially distended condition to pass therethrough with clearance.

As above indicated, an essential element of the invention is the provision of a stream of high velocity coolant such as air which is introduced adjacent to the upwardly moving column of tubing, so as to cause coolant to impinge upon the tubing while being heated and also in the vicinity of the draw zone. As shown in FIG. 3, this air stream may be introduced between the heaters 44, 46 by means of an air ring 50, supplied by a compressor or blower 51. Thus, as the tubing 20 advances to the squeeze rolls 34, it is surrounded by an upwardly moving stream of air. This stream of air is composed in part of ambient air drawn inwardly about the tubing 20 by the upward movement of the tubing, by the chimney effect of the radiant heaters and partly by air induced by the passage of the high velocity stream emanating from the air ring 50. The heaters are situated and adjusted so that the air stream initially at room temperature always remains at a temperature below that of the tubing in the draw zone, thus serving to control the temperature of the tubing and to prevent overheating of the tubing in the draw zone.

The air ring, as shown in FIG. 4, has a slot orifice 55. The angle which the plane of the slot orifice form with the axis of the upwardly moving tubing 20 and the heater system 30, is critical only in so far as it is necessary that the high velocity stream be directed in a generally upward direction.

The flow of ambient air, due to passage of the tubing and due to the chimney effect, introduces air below the heater 48, as indicated by arrows 60, between heaters 46 and 48, as indicated by arrows 62, between heaters 44 and 46 as indicated by arrows 64, and between heaters 42 and 44 as indicated by arrows 66.

The volume of air delivered by blower or compressor 51 need not be large in comparison to the aforementioned air flows. The flow of air induced by the high velocity air stream indicated by arrows 68, in combination with the other air flows produces the desired cooling effect.

The tubing 20 is thus cooled by the upward flow of air during its ascent through the heater system 30.

It is preferred to rapidly cool the expanded tubing after the expansion is completed, to produce film having maximum shrinkage by prevention of annealing.

An air ring 53 can be provided, as shown in FIG. 3, in order to rapidly cool the tubing and stabilize the air blow and bubble if so desired. An exhaust system 54 in addition to serving to withdraw heated air, can further contribute somewhat to the upward flow of air through the heater system 30, because of its vacuum effect.

In the event that the percent shrinkage of the film at a particular temperature is in excess of the desired amount, the film can be annealed in any manner as well known in the art. U.S. Pats. 3,076,232 and 3,022,543 for example, are directed to annealing operations.

If annealing is desired, the tubing can be reinflated to form a bubble 70, thus putting the tubing under tension. The tubing is heated by means of a radiant heater 72 which heats the tubing to the annealing temperature while the tubing is maintained in the stretched condition. The degree of transverse tension can be regulated by varying the degree of inflation of the bubble 70, while machine direction tension is regulated by controlling the relative speeds of the pairs of squeeze rolls 74 and 76.

In the spaced heating units shown there is a greater cooling effect imparted to the fluid stream by the air inflow through the spacing between the upper heaters than that created by the inflow through the spacing between the lower heaters. This would appear to be due to the fact that the air in the region of the lower heaters has been heated to a relatively low degree by the heaters, whereas the air in the region of the upper heaters has been heated to a relatively large extent and must be substantially reduced in temperature in order to produce the desired effects.

As shown in the drawings the temperature of the cooling fluid is decreased at the indicated points by the inflow of ambient air between the spaced heating units. Other methods of reducing the fluid temperature can be used, such as blowing cooled or ambient air into the desired area, using a cooling ring in the path of the fluid stream, withdrawing heated fluid and replacement with lower temperature fluid.

It is to be understood that it is most desirable to uniformly control the temperature about the circumference of the tubing. Preferably the heating elements are uniformly spaced about the circumference of the heaters and the passage of the tubing aligned to pass through the center thereof.

Certain non-uniformities in processing, such as variation in film thickness, unequal heating of the surface of the tubing, non-uniform air flows, and the like can be obviated by rotation oscillation alone or in combination with the heater system, the air ring, or tubing with respect to the vertical axis of the tubing.

It is to be understood that one of the critical objects of this invention is to control the temperature of the film in the draw or expansion zone. One method shown continuously envelops the primary tubing and the tubing material in the draw or expansion zone with a stream of coolant at a temperature below that of the film in the draw zone. As shown, this is best accomplished by the introduction of a stream of high-velocity air in the heating zone adjacent to the ascending column of tubing. The exact location of the point of introduction of such stream can vary somewhat and can be easily ascertained with simple empirical tests depending upon the size of the tubing being handled, the degree of thinning of wall section to be accomplished, the nature of the material being treated, and the dimensions of the heating zone, to name several factors. However, as a general guide, it may be stated that the air stream must not be introduced so closely to the draw zone as to destroy the physical stability of the tubing, that is to cause it to vibrate or "wobble." Furthermore, it will be apparent that if benefit is to be obtained from the air stream, it must not be placed so far away from the draw zone that its velocity at the time of impingement has dropped to greater than would be achieved as a result of the chimney effect. In the experimental work in connection with the invention, it has been found that the preferred location for the introduction of the high velocity air stream is about midway of the heating zone, and it may be stated that if this location is employed with heaters of the dimensions described, and velocities of air introduced within the range discussed, satisfactory results will be obtained. It is to be understood that a plurality of air rings can be used if necessary to control the fluid coolant temperature.

It should also be understood that, although the use of a plurality of cylindrical heaters has been described, the heater system can be, in effect, one heater with individually controlled zones and having vents along its length through which air or other coolants can flow. The length of the heater system and the number of heaters (or individually controlled units) employed will depend upon the particular operating conditions and is not narrowly critical.

A typical set of operating conditions can conveniently be illustrated by reference to a material such as low-density tubular polyethylene resins having densities lower than 0.94, melt indices not greater than 0.3, and intrinsic viscosities of 1.2 or greater to form 8-inch to 15-inch wide tubular bioriented films 2.0 mils to 3.0 mils in thickness as follows:

A seamless primary tube is first made by the well known blown-tube melt-extrusion process 2 inches to 5 inches in flat width and 20 to 80 mils thick.

The primary tube after flattening is then fed through squeeze rolls 26, reinflated with air introduced through squeeze rolls 28 and then fed vertically upward through a vertical bank of multiple heaters conveniently at least 4 cylindrical radiant electrical heaters. Each heater has an internal diameter large enough to permit the free movement of the tubing and air within the heaters and to avoid overheating of the air. Heaters from 8 inches to 20 inches in internal diameter and 10 inches to 20 inches tall are conveniently employed. The top heater is preferably at least about 15 inches in inside diameter. The bottom three heaters 44, 46, and 48 and each provided with 9 quartz tube heaters, each of 1000 wattage capacity, spaced evenly around the inner circumference of the heater. The space between the bottom two heaters can be small or even eliminated in some cases, but the spaces between heaters 42 and 44 and between 44 and 46 is preferably at least 1 inch and not greater than 5 inches so the vertical bank of heaters is generally on the order of about 6 feet tall. Each heater is controlled by one or more variable transformers to permit adjustment of their temperatures.

A circular air ring, having an inside diameter great enough to permit the free passage of tubing, and conveniently, having a 6 inch inside diameter can be fed by compressed air. The air ring must not be so large in size as to interfere with the upward flow of air, represented by arrows 60 and 62.

The air ring is positioned between the two top and two bottom cylinder heaters, and concentric with the axis of the cylindrical heater column with the openings in the air ring arranged to supply 20 to 100 cubic feet of compressed air at calculated velocities of 10,000 feet to 100,000 feet per minute vertically upward, and substantially parallel to the primary tube.

The heaters are adjusted by means of variable transformers to heat the primary tubing while passing through the heater stack to at least the draw temperature, and the concurrent flowing air surrounding the tubing and impinging upon it in the vicinity of the draw point to an air temperature which is 10° F. or more below the draw temperature. The combination of the radiant heat and cooling effect of the air surrounding the tubing and impinging upon it in the vicinity of the draw point, induced by passage of the tubing, by chimney effect, and the high velocity air introduced midway in the heater stack, controls the temperature of the tubing at the draw point. The hot air surrounding the tubing can be removed about the top radiant heater by means of an exhausting air ring operating at 5 inches of water absolute pressure surrounding the tubing 20 of FIG. 3 whereby the surface temperature of the film is maintained at the desired temperature. An iris type of opening 56 and exit 58 is provided to control the clearance between the film and the exhausting air ring.

Also, if maximum shrinkage is desired in the resultant tubing a cold air compressed ring may also be interposed between the top of the heating stack and the exhaust air ring to impose about the tubing additional ambient temperature to further cool the bioriented tubing.

The temperature of the fluid coolant in the draw or expansion zone is maintained substantially below the temperature of the film at the draw point to obtain accurate control of temperature of the film. It has been found that satisfactory orientation processing occurs when the fluid coolant in the draw zone is maintained at temperatures of from 10° F. to 60° F. below the temperature of the film. To impart optimum shrinkage to the film, it is preferred to maintain the fluid coolant at temperatures of from 30° F. to 50° F. below the temperature of the film. At fluid coolant temperatures less than 10° F. from that of the film temperature it is extremely difficult to impart orientation and to process continuously. At temperature differentials greater than 60° F., the cooling effect appears to be too great to permit uniform temperature control and the tubing easily breaks.

In the production of biaxially oriented film to be used as a packaging material for shrink packaging, it is desirable, that at temperatures below 100° C., the film exhibit a sufficient percentage shrinkage accompanied by high shrink forces to result in a good conforming package.

It has been found that the lower the temperature of the tubing at the time of drawing or radial expansion for biorientation, the higher the percent shrinkage and higher shrink force imparted at a given temperature.

For polyethylene resins having a density less than 0.94 it has been found that draw point temperatures of 15° F. to 50° F. below the crystalline melting point of the resin results in good shrinkage and high shrink force at 90° C.

To impart adequate biaxial orientation it has been found that the film must be radially stretched to result in a thickness reduction of at least 10 fold and must have adequate strength at the draw point. It has been found that the minimum tensile strength at the draw temperature for practical operation is 230 pounds per square inch.

To prepare polyethylene films having a percent shrinkage of at least 10% and a shrink force of at least 95 grams per mil at 90° C., it has been found that it is advantageous that the resin density be not greater than 0.925 g./cc.

In Table C there are shown the tensile strengths at the draw temperatures of various polyethylene films which have been biaxially oriented in the apparatus of this invention.

It is obvious to those skilled in the art that the apparatus of the invention is applicable to other plastic films such as polyolefins, polypropylene, high density polyethylene, polyethylenes having densities less than 0.94 g./cc.; polyethylene having densities less than 0.925 and others including copolymers, interpolymers and the like.

The following examples illustrate the practice of the invention.

EXAMPLE I

Low density polyethylene was bioriented in accordance with the method and apparatus as shown in FIG. 3. The resin employed had a density of 0.9229 g./cc., a melt index of 1.78, an intrinsic viscosity of 1.11 and a crystalline melting point of 112° C. (233.6° F.).

A 20 mil thick, 3.56 flat width primary tube was made by the blown tube method of extrusion as shown in FIGS. 1 and 2, wherein the die temperature was 360° F., the die diameter 1.25 inches, the die orifice 0.050 inch. The roll speed was 3¼ feet per minute. This tube was expanded into a 13 inch, flat width bioriented tube having a thickness range from 1.7 to 2.3 mils. The upper rolls were operated at a peripheral speed of 11.75 feet per minute and the lower rolls at 3.25 feet per minute for a ratio of 3.6 to 1.

The draw point was maintained 6 inches below the top of the upper heater and the air temperature at this point was 150° F. while the film temperature was at 208° F.

The apparatus used in the biorientation is as follows:

The heaters, in ascending order, had inside diameters of 10 inches, 12 inches, 12 inches and 19 inches, and heights of 16.5 inches for the lower three heaters and 19.5 inches for the top heater. The lower two heaters (46 and 48) were 3 inches apart, the middle two heaters (44 and 46) were 3.25 inches apart, and the top two heaters (42 and 44) were 4.5 inches apart. The uppermost heater (42) was provided with 18 quartz tube infrared elements, each of 1000 watt capacity, spaced evenly around the inner circumference of the heater. The lower three heaters (44, 46, and 48) were each provided with 9 quartz tube infrared elements, each of 1000 wattage capacity, spaced evenly around the inner circumference of the heaters. The current input to the elements in each heater was controlled by a variable transformer. The inside surface of all the heaters was comprised of metal screening. The quartz infrared elements were positioned immediately behind the screening.

The lower air ring (50) was positioned between the center heaters and had a 6 inch inside diameter, 8⅝ inch outside diameter and 2.5 inches high. Air was supplied to the air ring at a pressure of 37 pounds per square inch (p.s.i.). Air was delivered through the ring at a rate of 80 cubic feet per minute (c.f.m.) at a calculated volocity of 61,000 feet per minute (f.p.m.) through an 0.01 inch orifice. The upper air ring (53) had an 11 inch inside diameter, 13.5 inch outside diameter and 1⅝ inches high. The air ring was positioned above heater (42) so that the space between the ring and heater (42) was ½ to 4 inches. Air was supplied to the air ring at a pressure of 20 p.s.i. Air was delivered through a 0.015 inch orifice at 42 c.f.m. and at a calculated velocity of 11,600 f.p.m. The ambient air temperature was 73° F. Pressurized air was supplied from a central system whereinthe temperature of the air was 70° C.

The exhaust system (54) positioned 8 inches above the upper ring was operated at 4.2 inches of water absolute pressure (vacuum pressure). The exhausted air entering the system was at a temperature of 122° F. There was provided a 3.5 inch clearance between the bubble and both the lower and upper irises.

The operating temperatures were achieved by having the variable transformer with a scale of 0 set in ascending order of heaters of 25, 27, 49 and 45, the amperage in the upper two heaters being 22.5 amps (heater 44) and 42.0 amps (heater 42).

The resultant film was very clear and glossy and operating conditions, as for example, the position of the bubble, were readily stabilized. There was no difficulty encountered in providing a continuous operation. Film shrinkage at 90° C. was 10% M.D. and 18% T.D. with a shrink force of 95 g./mil M.D. and 185 g./mil T.D.

By way of comparison using the same type primary tubing as above, the tubing can not be bioriented using the prior art method using a single continuous heater having only a bottom and top opening such as shown in French Pat. No. 1,274,521.

EXAMPLES II–VI

Low density polyethylene, having a density of .9166 and a melt index of .06 and an intrinsic viscosity of 1.42, a crystalline melting point of 110° C. (230° F.) was processed into a flattened tubing having a flat width of 2.75 inches and a thickness of 46 to 50 mils in apparatus as illustrated in FIGS. 1 and 2 under the conditions shown in Table A.

The lower three heaters employed had nine 1000 watts, quartz heating elements, while the top heater had eighteen elements. The upper heater had an inside diameter (I.D.) of 19.5 inches while the lower three heaters had 14.5 inches inside diameters. Each of the lower three heaters were 16.5 inches high while the top heater was 20 inches high.

The space between the uppermost heater and the next highest was 5 inches, the next lower spacing was 3.5 inches and the spacing between the two lowest heaters was 3 inches.

The upper air ring had a 15 inch I.D. and the lower air ring had a 6 inch I.D. The upper air ring was provided with a water cooling chamber and the exhaust system was operated at a vacuum pressure of 6 inches of water.

The draw point was maintained at a distance of about 10 inches below the top of the uppermost heater. An upper air ring was not employed in this example.

The lower rollers operated at a speed of 3.5 feet/minute (ft./min.) as compared to 15.87 ft./min. for the upper rollers for a ratio of 4.53 to 1.

Additional operating conditions are set forth in Table 1. The change in temperature of the air from the lower air ring was converted into a change in air flow.

TABLE 1

| Example | II | III | IV | V | VI |
|---|---|---|---|---|---|
| Lower air: | | | | | |
| Pressure (p.s.i.) | 18 | 18 | 18 | 18 | 18 |
| Air flow (cu. ft. min.)* | 125 | 125 | 120 | 118 | 112 |
| Oriented tubing: | | | | | |
| Flat width (inches) | 13.6 | 13.9 | 13.75 | 13.9 | 13.7 |
| Gauge (mils): | | | | | |
| High | 2 | 2.2 | 2.1 | 2.2 | 2.4 |
| Low | 1.7 | 1.9 | 1.8 | 1.9 | 1.9 |
| Relative heater setting: | | | | | |
| Top heater (42) | 29 | 29 | 29 | 29 | 29 |
| Next to top (44) | 30 | 30 | 30 | 30 | 32 |
| Next to lowest (46) | 43 | 40 | 41 | 41 | 39 |
| Lowest (48) | 32 | 30 | 31 | 31 | 28 |
| Operating temperatures, °F.: | | | | | |
| Draw point: | | | | | |
| Air | 150 | 154 | 149 | 153 | 155 |
| Film | 203 | 205 | 200 | 201 | 207 |
| Expansion zone: | | | | | |
| Air | 150 | 148 | 144 | 153 | 140 |
| Film | 202 | 188 | 195 | 200 | 192 |
| Iris: | | | | | |
| Air | 75 | 84 | 81 | 82 | 83 |
| Film | 112 | 109 | 113 | 108 | 115 |

*Air flows are corrected for standard temperatures.

The resultant films exhibited the following percent shrinkage and shrink force at 90° C.

TABLE 2

| | Shrink force at 90° C. | | Percent Shrinkage | |
|---|---|---|---|---|
| | M.D. | T.D. | M.D. | T.D. |
| Example: | | | | |
| 2 | 120 | 200 | 14 | 23 |
| 3 | 105 | 210 | 13 | 23 |
| 4 | 110 | 200 | 15 | 24 |
| 5 | 100 | 190 | 12 | 23 |
| 6 | 110 | 200 | 14 | 24 |

It is seen that the degree of orientation, as indicated by percent shrinkage at 90° C. is substantially independent of the temperature of the high velocity air streams from the lower air ring. This would appear to be due to the fact that the quantity from the air ring is small, when compared to the total quantities of air flow, and, therefore, the temperature of the overall air stream is not substantially affected by the temperaure of the forced air from the lower air ring.

Examples VII and VIII illustrate the measured air flow rate at various points in the described apparatus.

EXAMPLE VII

The operating procedures of the foregoing Examples II–VI were followed except that a primary tube was made from a polyethylene resin having a density 0.9199, a melt index of 0.25, and having a flat width of 2.75 inches was oriented to yield a 2 mil tubular film having a 13.75 inch flat width.

The air ring between the middle two heaters discharged 50 cubic feet per minute (c.f.m.) of air. The 6 inch I.D. air ring had an orifice setting of .012 inch, and the calculated air velocity was, therefore, 31,800 feet per minute (f.p.m.).

The heater spacings in descending order were 10 inches (upper heater to exhaust), 4 inches, 4.5 inches and 3 inches.

The air flows were as follows:

TABLE 3

| | Quantity (c.f.m.) | Air velocity (f.p.m.) |
|---|---|---|
| Below lowest heater (60) | 174 | 167 |
| Between bottom two heaters (61) | 122 | 62 |
| Between middle two heaters (64) | 271 | 92 |
| Between top two heaters (66) | 1,008 | 399 |
| Out of top heater | 1,575 | 948 |
| Between top heater and exhaust | 966 | 158 |
| Into exhaust, past top iris | 113 | 875 |
| Out of exhaust | 2,704 | |

The induced air flow of ambient air through the stack of heaters due to change in high calculated velocity air flow in lower air ring is as follows:

TABLE 4

| Quantity of air (c.f.m.) | 23 | 40 | 65 |
|---|---|---|---|
| Orifice setting (inches) | .010 | .010 | .012 |
| Calculated velocity (f.p.m.) | 17,600 | 30,600 | 41,400 |
| Induced air flow (c.f.m.) | 368–436 | 642–765 | 1,040–1,235 |

EXAMPLE VIII

The procedures of Example VII, were followed except as hereinafter indicated.

The primary tube was made from a polyethylene resin having a density of 0.9166, a melt index of 0.06, an intrinsic viscosity of 1.42, and a crystalline melting point of 110° C. (230° F.) and was expanded from a 3.1 inch flat width to an oriented tube having a 14 inch flat width. The bottom rollers had a roll speed of 4.5 f.p.m. as compared to a roll speed of 19 f.p.m. for the upper rollers.

The air pressure in the lower 6 inch I.D. air ring was 28 p.s.i. while an upper 11 inch I.D. air ring was employed as shown in FIG. 3, and operated at a pressure of 32 p.s.i. The lower air ring delivered 80 c.f.m. of air, at a discharge velocity of 61,400 f.p.m. through a 0.010 inch orifice. The upper air ring delivered 120 c.f.m. of air, at a velocity of 33,400 f.p.m. through an 0.015 inch orifice.

The air from the upper air ring as in the case of the lower air ring, was forced upwardly at an angle to the tubing of 45°.

The heater spacings in ascending order were 3.0 inches, 4.5 inches and 5.5 inches. The air flows were as follows:

TABLE 5

| | Quantity (c.m.f.) | Air Velocity (f.p.m.) |
|---|---|---|
| Below lowest heater | 150 | 198 |
| Between bottom two heaters | 115 | 64 |
| Between middle two heaters | 258 | 100 |
| Between top two heaters | 717 | 227 |

The shrinkage of the film at 90° C. was 13% in the machine direction and 22% in the transverse direction. The shrink force at 90° C. was 115 gms. in the machine direction and 80 gms. in the transverse direction.

EXAMPLES IX–XIV

The operating procedures of Example VIII were followed except as noted hereinafter.

The thermoplastic resin employed was low density polyethylene, having a density of 0.9193, an intrinsic viscosity of 1.34, a melt index of 0.5, and a crystalline melting point of 110° C. (230° F.).

The primary tubing had a 2.5 inch flat width and a gauge ranging from about 29 to 32 mils.

In Examples IX and X the lower roll speed was 3 ft./min. and the upper roll speed was 12.5 ft./min. for a ratio of 4.17 to 1.

In Examples XI to XV the upper roll speed was increased to 13.5 ft./min. for a ratio of 4.5 to 1.

Additional operating conditions are set forth in Table 6, while properties of the films produced in accordance with the examples are set forth in Table 7.

EXAMPLE XV

The operating procedures of Examples II through VI were followed except as hereinafter indicated.

The low density polyethylene of Examples II–VI was mixed with diatomaceous earth and titanium dioxide to yield a mixture having in percentage by weight, 99% polyethylene, 0.5% diatomaceous earth and 0.5% titanium dioxide.

The primary tube had a flat width of 3.75 inches and a gauge ranging from about 22 to 26 mils.

The lower air ring operated at a pressure of 28 p.s.i. and delivered 134 c.f.m. of air. A top air ring was not employed. The roll speeds were 5 ft./min. and 18.5 ft./min. for the lower and upper rolls, respectively, for a ratio of 3.7 to 1.

The heater settings were, in ascending order of heaters, 26, 30, 42 and 40. The amperage in the upper two heaters was 20.5 amps and 40 amps, respectively.

The resultant oriented tubing had a flat width of 11.6, a gauge ranging from about 2.2 to 2.6 mils, and exhibited percent shrinkages at 90° C. of 17% M.D. and 24% T.D.

By way of comparison, the air-flow through the lower air ring was stopped and the heater settings lowered to compensate for decreased flow of cooling air. The roll speeds were at 5 ft./min. and 21 ft./min. for the lower and upper rollers, respectively, for a ratio of 4.2 to 1.

The heater settings were, in ascending order of heaters, 12, 18, 30 and 39. The amperage in the upper two heaters was 17 and 38 amps, respectively.

The heater spacings were 3 inches, 3.7 inches and 4.75 inches between the bottom two heaters, the middle heaters, and the top two heaters, respectively. The exhaust plenum was spaced 14 inches from the top of the upper heater. The heaters were of the type as previously described.

The operating conditions for Example XV, and the control are set forth in Table 8.

The resultant film production in accordance with Example XV, exhibited at 90° C. the following properties.

|  | Percent shrink | | Shrink force | |
|---|---|---|---|---|
|  | M.D. | T.D. | M.D. | T.D. |
| XV | 12 | 20 | 105 | 175 |
| Control | 6 | 11 | 60 | 95 |

In the control with no air being added through the air ring the bubble wavered and broke continuously by rising into the ladder. The film had a poor appearance and was irregular. There was virtually no control of thickness or diameter. The diameter of the tube remained at 14–15 inches even when the pressure within the bubble was reduced.

TABLE 6

| Example | IX | X | XI* | XII* | XIII | XIV* |
|---|---|---|---|---|---|---|
| Air ring pressure (p.s.i.): | | | | | | |
| Lower | 46 | 20 | 10 | 0 | 46 | 9 |
| Upper | 30 | 30 | 30 | 30 | 30 | 30 |
| Oriented tubing: | | | | | | |
| Flat width (inches) | 11.75 | 12.5 | 13 | 13.6 | 12.2 | 13.9 |
| Thickness (mils): | | | | | | |
| Low | 1.5 | 1.3 | 1.1 | 0.9 | 1.3 | .9 |
| High | 2 | 1.7 | 1.6 | 1.6 | 1.7 | 1.4 |
| Relative heater settings: | | | | | | |
| Top heater | 15 | 15 | 15 | 15 | 15 | 15 |
| Next to top | 20 | 20 | 20 | 20 | 20 | 20 |
| Next to lowest | 35 | 33 | 33 | 33 | 33 | 33 |
| Lowest | 25 | 25 | 25 | 25 | 30 | 26 |
| Operating temperatures, °F.: | | | | | | |
| Draw point: | | | | | | |
| Air | 155 | 153 | 163 | 187 | 158 | 162 |
| Film | 188 | 208 | 218 | 225 | 193 | 223 |
| Expansion zone: | | | | | | |
| Air | 157 | 148 | 151 | 170 | 158 | 155 |
| Film | 190 | 198 | 211 | 218 | 195 | 200 |

*Continuous operation difficult to maintain. Only short lengths of oriented tubing obtained.

TABLE 7

| Example | IX | X | XI | XII | XIII | XIV |
|---|---|---|---|---|---|---|
| Haze | 2.6 | 3.5 | 4.4 | 7.7 | 2.9 | 8.0 |
| Gloss (45°) | 92.8 | 68.2 | 79.4 | 68.7 | 89.2 | 61.7 |
| Specular transmission | 80 | 76 | 74 | 65 | 76 | 60 |
| Blocking | 55.8 | 36.3 | 27.0 | 15.3 | 42.0 | 21.2 |
| Slip | 214 | 172 | 152 | 155 | 194 | 160 |
| Falling ball test | 37.1 | 28.3 | 30.0 | 31.4 | 36.7 | 27.4 |
| Thickness of samples tested: | | | | | | |
| Minimum | 1.40 | 1.40 | 1.20 | 1.10 | 1.40 | 0.90 |
| Maximum | 1.90 | 1.80 | 1.80 | 1.80 | 1.80 | 2.90 |
| Tensile strength: | | | | | | |
| M.D. | 9,300 | 10,500 | 9,800 | 7,400 | 10,600 | 6,700 |
| T.D. | 11,600 | 11,300 | 10,200 | 9,000 | 11,500 | 8,800 |
| Elongation break: | | | | | | |
| M.D. | 278 | 252 | 274 | 328 | 252 | 338 |
| T.D. | 156 | 179 | 178 | 276 | 142 | 208 |
| Shrinkage, 90° C.: | | | | | | |
| M.D. | 11 | 11 | 8 | 5 | 12 | 5 |
| T.D. | 18 | 17 | 12 | 7 | 21 | 6 |
| Shrink force, 90° C.: | | | | | | |
| M.D. | 105 | 95 | 75 | 60 | 115 | 25 |
| T.D. | 230 | 185 | 130 | 85 | 215 | 50 |
| Room temp.: | | | | | | |
| M.D. | 100 | 95 | 75 | 70 | 105 | 65 |
| T.D. | 155 | 125 | 95 | 75 | 140 | 55 |
| Shrinkage: | | | | | | |
| 95° C.: | | | | | | |
| M.D. | 15 | 13 | 11 | 8 | 16 | 7 |
| T.D. | 18 | 17 | 12 | 7 | 21 | 6 |
| 100° C.: | | | | | | |
| M.D. | 23 | 25 | 20 | 13 | 24 | 10 |
| T.D. | 36 | 32 | 25 | 20 | 38 | 16 |
| 108° C.: | | | | | | |
| M.D. | 64 | 66 | 59 | 49 | 68 | 49 |
| T.D. | 71 | 69 | 62 | 59 | 71 | 56 |
| Draw point temperature (°F.) | 188 | 208 | 218 | 225 | 193 | 223 |

TABLE 8

|  | XV | Control |
|---|---|---|
| Oriented tube: | | |
| Flat width (inches) | 11.6 | 14.87 |
| Gauge (mils): | | |
| High | 2.6 | 1.8 |
| Low | 2.2 | 1.1 |
| Air flow (c.f.m.): | | |
| Below bottom heater | 37.3 | 26 |
| Between bottom two heaters | 95.6 | 59.6 |
| Between middle heaters | 253 | 39.4 |
| Between two top heaters | 719 | 345 |
| Between exhaust and top heater |  | 1,885 |
| Out of exhaust | 2,850 | 2,762 |
| From air ring | 59.6 | None |
| Operating temperatures, °F.: | | |
| Ambient air | 91 | 90 |
| Primary tube | 95 | 90 |
| Between bottom two heaters: | | |
| Air | 115 | 110 |
| Film | 153 | 115 |
| Between middle heaters: | | |
| Air | 162 | 130 |
| Film | 190 | 135 |
| Between top two heaters: | | |
| Air | 142 | 143 |
| Film | 207 | 213 |
| At draw point: | | |
| Air | 142 | 143 |
| Film | 207 | 213 |
| Above top heater: | | |
| Air | 132 | 155 |
| Film | 202 | 212 |

TABLE A.—PRIMARY TUBE EXTRUSION CONDITIONS

| Example: | Die temp., °F. | Die diameter (in.) | Die orifice (in.) | Roll speed (primary) ft./min. |
|---|---|---|---|---|
| I | 360 | 1.25 | .050 | 3¼ |
| II–VI | 390 | 1.5 | .050 | 3½ |
| VII | 390 | 1.5 | .050 | 3½ |
| VIII | 400 | 1.5 | .050 | 4½ |
| IX–XIV | 400 | 1.5 | .050 | 3 |
| XV | 400 | 1.25 | .050 | 5 |

TABLE B.—BIORIENTATION ROLL SPEEDS

| Example: | Upper roll, ft./min. | Lower roll, ft./min. |
|---|---|---|
| I | 11¾ | 3¼ |
| II–VI | 15⅞ | 3½ |
| VII | 16¼ | 3½ |
| VIII | 18⅛ | 4½ |
| IX | 12.5 | 3 |
| X–XIV | 13.5 | 3 |
| XV | 18.5 | 5 |
| XV (control) | 21 | 5 |

TABLE C

| Melt index | Density | Intrinsic viscosity | Crystalline melting point °C. | Crystalline melting point °F. | Drawpoint temp., °F. | Tensile strength at drawpoint temp. (p.s.i.) | Maximum drawpoint temp., °F. | Tensile strength at max. drawpoint temp. (p.s.i.) |
| --- | --- | --- | --- | --- | --- | --- | --- | --- |
| 0.18 | .9148 | 1.33 | 105 | 222 | 197 | 451 | 199 | 433 |
| .27–.39 | .9152 | 1.26 | 104 | 220 | 200 | 438 | 210 | 234 |
| .23–.39 | .9140 | | | | | | | |
| .12 | .9228 | 1.21 | 110 | 229 | 187 | 809 | 207 | 545 |
| .193 | .9189 | 1.26 | 109 | 228 | 188 | 774 | 203 | 529 |
| 1.776 | .9229 | 1.11 | 112 | 234 | 208 | 536 | 208 | 536 |
| .08 | .9154 | 1.30 | 110 | 230 | 203 | 458 | 213 | 317 |
| .06 | .9166 | 1.42 | 109 | 230 | 197 | 686 | 217 | 270 |
| .05 | .9193 | 1.34 | 110 | 230 | 193 | 863 | 208 | 544 |
| .25 | .9199 | 1.16 | 111 | 233 | 196 | 629 | 198 | 640 |
| .19 | .9207 | 1.19 | 115 | 239 | 202 | 687 | 216 | 398 |

The following is a glossary of terms employed throughout the present specification:

Draw Point Temperature: The tubing in passing through the heater, becomes drawable and radially expands at a well-defined point herein referred to as the draw point. The temperature of the tubing at the draw point was measured by placing an iron-constantan thermocouple in contact with the external tubing surface at the point it became drawable and radially expanded.

Melt Index: ASTM Test D 1238–52T; ASTM Standards, 1952, Part 6, p. 735. The flow rate is rate of extrusion in grams per 10 minutes (unless otherwise explicitly indicated).

Tensile Strength: ASTM Test D 882–54T–C; ASTM Standards of Plastics, October 1955, p. 222, Scott Inclined Plane Tensile Strength Tester. A sample one inch long by ½ inch is used. Tensile Strength is given in pounds per square inch based on original cross-section area of the sample.

Air Temperature: The air temperature in the heaters was measured by placing an iron-constantan thermocouple in the air at the indicated position.

The Crystalline Melting Points were determined by observing the loss of birefringence between crossed Nicols on a hot stage microscope.

Intrinsic Viscosity was determined according to ASTM D1601–58T, except that a Decalin temperature of 135° C. was used and no end effect correction for the viscometer was used. The values given are in deciliters per gram.

Shrinkage was obtained by immersing, for 5 seconds, a marked length of a one inch wide strip of film into a bath maintained at the indicated temperature. The film was held at one end with a clip and the other end was free. The values are in percentage of original sample tested.

Elongation: ASTM Test D882–54T–C; ASTM Standard on Plastics, October 1955, p. 222. Determined on same machine and sample as tensile strength. Values are in percentage of original sample tested.

Density: is measured in grams per cubic centimeter in a gradient column made up of water, mehanol and sodium acetate at 25° C.

Haze: ASTM Test D 1003–52; the percentage of transmitted light which, in passing through the specimen sample, deviates from the incident beam by forward scattering.

Shrink Force: The stress in grams per mil per inch width to prevent shrinkage as measured by clamping a one inch wide strip of film between a stationary clamp and a strain gauge and immersing the film in a silicone oil at the indicated temperature for about 5 seconds. The maximum stress figure developed is recorded. The sample is removed and allowed to air cool for about one minute. The maximum stress at room temperature is also recorded.

Strength at High Temperatures: Samples of low density polyethylene were prepared by compression molding the resin between Mylar polyethylene terephthalate sheets at 300° F., under a pressure of 4000 p.s.i. for one minute in a Wabash hydraulic press. The plaques were then slow cooled to room temperature and cut into 0.5" strips. The thickness of these samples was approximately 0.020".

An Instron Tensile Tester equipped with air conditioning unit made by Cook Electric was used to determine the stress-strain curves at various temperatures. The temperature was maintained with ±2° F. Continuous air circulation within the test compartment provided even temperature distribution and baffling insured shielding of the test specimen from the heating coils.

Tensile strengths and elongations were determined from stress-strain curves at various temperatures. Each sample was held in the test chamber for 6–10 minutes in order to insure that the samples reached the prescribed temperature before testing commenced.

It is obvious that many changes and modifications can be made in the above described details without departing from the nature and spirit of the invention.

What is claimed is:

1. An apparatus for use in the biaxial orientation of thermoplastic tubing comprising:
   (a) a radiant heater system having individually controlled heating zones, said radiant heater system having a vertically extending passage therethrough and vents along the length of said system, the lower open end of said passage being an inlet port for a fluid coolant stream and said tubing, the cross-sectional area of said passage being at least equal to the cross-section area of said fluid stream and said tubing, and said vents providing conduit means for delivering a further fluid coolant stream upwardly to said passage at a point within the passage and above said lower end;
   (b) means to maintain an isolated bubble of a fluid within a thermoplastic tubing as said tubing travels through said heating system; and,
   (c) means for passing said tubing upwardly within said radiant heater system.

2. An apparatus for use in the biaxial orientation of thermoplastic tubing comprising:
   (a) a radiant heater system comprising a plurality of spaced radiant heaters, said radiant heater system having a vertically extending passage therethrough, the lower open end of said passage being an inlet port for a fluid coolant system and said tubing, the cross-sectional area of said passage being at least equal to the cross-sectional area of said fluid stream and said tubing, and the space between said heaters providing conduit means for delivering a further fluid coolant stream upwardly to said passage at a point within the passage and above said lower end;
   (b) means to maintain an isolated bubble of a fluid within a thermoplastic tubing as said tubing travels through said heating system; and
   (c) means for passing said tubing upwardly within said radiant heater system.

3. The apparatus of claim 2 further including means for delivering a stream of high velocity fluid concurrently with said tubing, said means for delivering said high velocity stream of fluid being positioned downstream of said conduit means for delivering a further fluid coolant, whereby said high velocity stream causes said further fluid coolant to flow through said conduit, by an aspiration effect.

4. The apparatus of claim 2, wherein said radiant heater system comprises at least three spaced radiant heaters, the space between two upper heaters providing conduit means for delivering said further fluid coolant stream, said means for delivering high velocity fluid being positioned between two lower heaters, and wherein an additional further fluid coolant stream is delivered to said passage through the space between said two lower heaters.

5. The apparatus of claim 2 further including cooling means being positioned above the heaters for cooling oriented tubing, comprising an exhaust means positioned about the tubing and spaced from the heater to allow cooling air to flow between said exhaust means and said heater.

References Cited
UNITED STATES PATENTS

| | | | |
|---|---|---|---|
| 2,529,897 | 11/1950 | Bailey et al. | 18—145X |
| 3,151,358 | 10/1964 | Gerber | 18—145 |
| 3,179,326 | 4/1965 | Underwood et al. | 18—145UX |
| 3,296,352 | 1/1967 | Riggs | 18—145X |
| 3,300,555 | 1/1967 | Bild et al. | 18—145X |
| 3,311,679 | 3/1967 | Moore | 18—145X |

J. SPENCER OVERHOLSER, Primary Examiner